(12) United States Patent
Atkins, III (10) Patent No.: US 6,593,848 B1
(45) Date of Patent: *Jul. 15, 2003

(54) MOTOR VEHICLE RECORDER SYSTEM

(76) Inventor: William T. Atkins, III, 7283 Pommel Dr., Eldersburg, MD (US) 21784

( * ) Notice: Subject to any disclaimer, the term of this patent is extended or adjusted under 35 U.S.C. 154(b) by 50 days.

This patent is subject to a terminal disclaimer.

(21) Appl. No.: 09/939,622

(22) Filed: Aug. 28, 2001

Related U.S. Application Data

(63) Continuation-in-part of application No. 09/511,277, filed on Feb. 23, 2000, now Pat. No. 6,310,541.

(51) Int. Cl.[7] .............................................. B60R 25/10
(52) U.S. Cl. .................... 340/426; 340/425.5; 340/540; 348/148; 360/5; 369/21
(58) Field of Search ............................... 340/425.5, 426, 340/540, 945; 348/148; 360/5; 369/21

(56) References Cited

U.S. PATENT DOCUMENTS 6,150,927 A * 11/2000 Nesbitt ........................ 340/426
6,310,541 B1 * 10/2002 Atkins ....................... 340/425.5

* cited by examiner

Primary Examiner—Julie Lieu
(74) Attorney, Agent, or Firm—Roylance, Abrams, Berdo & Goodman, LLP.

(57) ABSTRACT

This invention relates to a Motor Vehicle Recorder System device, which consists of a recorder device, microphones and a camera system installed in an automobile to record a conversation or other events. The invention reveals a recorder installed in a motor vehicle with a microphone positioned on the driver's side and a camera system preferably concealed in a decorative ornament. This recording system can be activated by either a foot switch, a voice activation switch, a remote wireless switch, or an airbag deployment. The system of the invention also includes activation in several different modes: (1) silent activation, (2) signal activation, (3) compliance activation whereby there is a message announcing that the incident is being recorded, and (4) automatic shut down of all other sound systems in the motor vehicle to allow this invention to function and record without background noise. In a preferred embodiment of the system, a transmitted is included in the system, and audio, video and other data are transmitted from the vehicle to a remote location. Also, the system can be interfaced with a GPS system so that a vehicle's instantaneous position information can be recorded along with the speed of the vehicle. The system has been designed to protect drivers involved in an accident, car failure, severe weather conditions or any other condition which causes the driver to abandon or leave the motor vehicle. The system has also been designed to protect law-abiding citizens and drivers in any attempted car-jacking situations and to discourage police officers from mistreating motorists and displaying unprofessional attitudes.

23 Claims, 5 Drawing Sheets

MOTOR VEHICLE RECORDER SYSTEM

This application is a continuation-in-part of U.S. patent application Ser. No. 09/511,277 filed Feb. 23, 2000, now U.S. Pat. No. 6,310,541, the contents of which are incorporated herein by reference.

FIELD OF THE INVENTION

The present invention relates to motor vehicle monitoring equipment. More particularly, the present invention relates to a system and method for recording vehicle speed and location, along with audio and video information recorded in and around the vehicle to make an unbiased record of events occurring around the vehicle, and to deter unwelcome activities.

BACKGROUND OF THE INVENTION

An objective of the design of this system has been to protect law-abiding citizens and drivers and to discourage police officers from mistreating motorists and displaying unprofessional attitudes. If a driver of a motor vehicle is involved with a car accident, severe weather conditions or any condition which causes the driver or passengers to abandon the motor vehicle, this invention allows a recording of a message and voice record of the event, facts, time, etc. to be conveniently made and preserved in the motor vehicle. If a car jacking is attempted, the driver can similarly record the conversation/criminal demand using this invention without notifying the perpetrator. Further, if a driver is stopped by a police officer, he is often instructed to raise his hands which prevents the driver from picking up any object that would be of potential harm to the Officer or also hand activating any devices inside the motor vehicle.

Courts and Administrative officers sometimes fail to recognize troubling situations whereby a motor vehicle driver is stopped, without any passengers in the motor vehicle or any witnesses whatsoever to the stop, only to have reduced credibility with his or her self-serving testimony regarding the display of unprofessional conduct by the police officer who made the stop. Law-abiding citizens and drivers need passive protection to discourage police officers from displaying unprofessional attitudes.

The Motor Vehicle Recorder System of the present invention comprises one or more microphones for recording sound as well as one of more cameras to record visual information installed in an automobile to record conversations and events. The device prior to activation of the microphones can optionally broadcast a warning message indicating that the conversation will be recorded or a short "beeping" warning message. This invention also automatically shuts down all other sound systems in the motor vehicle to allow the device to function and record without background noise.

This invention preferably includes a recording device attached to one or more sensitive microphones, one or more pin-hole cameras, a speaker and an activation system. The activation system includes a heavy-duty foot button, installed next to the motor vehicle's brake pedal, and which will only be activated when firmly depressed for two seconds. The activation system also includes a switch, which automatically turns off the radio, tape deck, or CD player installed in the motor vehicle in order not to record such background sounds. This activation system also includes a voice activation feature, which permits the entire Motor Vehicle Recorder System to alternatively be activated by the voice command of the driver or passengers. The system further is integrated with an airbag deployment system within the vehicle to be activated whenever airbags are deployed. The Motor Vehicle Recorder System also includes a feature, which constantly and silently monitors the speed of the motor vehicle and automatically records the speed of the motor vehicle 30 seconds prior to activation.

An embodiment of the system also includes 3 wide-angle cameras, each with an effective 120-degree range of sight. Those of skill in the art will also recognize that the system could include 4 cameras each having a 90-degree field of vision, or any other number of cameras appropriately positioned in and around the vehicle to record events. The cameras are equipped with night vision capability and auto iris lenses to allow for a high-resolution image in any light condition. The vehicle tracking system provides a time-stamped record of the speed, acceleration and deceleration of the vehicle. A GPS system is included and aids the occupants of the vehicle to find their way when necessary, provides the ability to track the vehicle if stolen, and also records the location of the vehicle in event of an alarm condition. The preferred embodiment of the invention also records all of the aforementioned data and transmits it to a remote monitoring station via cellular or other wireless communication.

In the prior art, small or mini tape recorders are well known for various applications and uses. U.S. Pat. No. 4,123,016 is such an invention, which discloses a device for adapting a mini tape recorder for transcribing use with a foot control. The patent reveals a mini tape recorder device to which a solenoid means is connected and adapted to actuate the recorder in forward or reverse wind control. The foot control means for this mini tape recorder apparatus is only for use of the mini tape recorder itself by a typist as a transcribing device. This invention does not teach use of such apparatus in a motor vehicle, or control of the mini tape recorder by any type of audio control, nor the alternative combination as in your invention, of either foot pedal control or audio control.

Other types of tape recorder control devices such as U.S. Pat. No. 4,207,440 discloses tape recorders with speech-extendable adjustment predetermined playback time. This patent disclosure shows a tape recorder with a stop-start motor which is controlled by a timer for which the run time and off time can be independently set by the voice of the user. However, this patent does not disclose the unique combination of the control features in the present invention, nor suggest use in a motor vehicle.

U.S. Pat. No. 4,371,750 discloses a microphone and a remote control system with adjustable gain devices. It is a patent for a hand held microphone and remote control system, which does not reveal use in a motor vehicle, nor control of the mini tape recorder by any type of audio control, nor the combination as in your invention, of either foot pedal control or audio control of a microphone and recording system. The claims of this patent focus on a public address system with an amplifier and a speaker coupled with a microphone circuit.

U.S. Pat. No. 4,817,127 is the parent patent of the basic dictating machine. As such, it is a complex patent and addresses the features of the new and improved 1989 Dictaphone dictating machine. Again, this patent is distinct from the present invention as this device does not disclose control of the mini tape recorder by any type of voice/audio control, nor the alternative combination as in the present invention, of either foot pedal control or voice/audio control nor suggest use in a motor vehicle.

U.S. Pat. No. 5,838,393, issued Nov. 17, 1998, discloses a unique audio-switching device, which allows the operator to control the selection of input and output signals. This patent was not focused at mini tape recorders, although the electronic circuitry is similar to the circuitry to activate a recorder by either a foot switch or alternatively control selection by voice activation. This invention does not teach its use for control of tape recorders by any type of voice/audio control, nor the combination as in the present invention, of either foot pedal control or voice/audio control of a microphone and recording system. This disclosure does not reveal use of the control device in a motor vehicle, and it is distinct from this invention.

U.S. Pat. No. 4,221,359 further adds to the control field in that it reveals a simple hydraulic valve, which is operated by a foot pedal control device. This patent discloses the operational details of the now well established fact that the rocking movement of the foot pedal can control a device such as the valve in that invention as it turns actuates the hydraulic feature of the valve. This disclosure is relevant to the foot control mechanism of the mini tape recorder invention, but it is distinct from the present invention.

SUMMARY OF THE INVENTION

In accordance with the invention, the Motor Vehicle Recorder System comprises a recording device connected to one or more microphones and/or cameras installed in an automobile to record conversations or events. A warning message indicating that the conversation will be recorded or a short warning beeper message can optionally be broadcast by the recorder through the speaker prior to activation of the microphones.

This invention includes a recorder electrically attached to one or more microphones and/or cameras, a speaker and an activation system. The activation system includes a heavy-duty foot button, and which is activated when firmly depressed for two seconds. The activation system also includes a switch, which automatically turns off the radio, tape deck, or CD player installed in the motor vehicle and record without background noise. This activation system also includes a voice activation feature, which permits the Motor Vehicle Recorder System to alternatively be activated by the voice command of the driver or passengers. The invention also includes a video cameras which can provide video verification of alarm events via wide angle night vision cameras, accurate record of vehicle speed, acceleration and deceleration via a vehicle tracking system, location of the vehicle via a global positioning system, and transmission of all of the aforementioned audio, video and data signals to a remote monitoring station.

BRIEF DESCRIPTION OF THE DRAWINGS

The above invention will be more readily understood with reference to the attached description and related figures in which.

In the figures it will be understood that like reference numerals refer to like structures.

DETAILED DESCRIPTION OF THE INVENTION

Referring to the drawings for a better understanding of the present invention, this invention is susceptible to embodiment in several different forms. The description, which follows, should be viewed as an illustration of the principles of the invention and is not intended to limit this invention to the embodiments illustrated in the drawings herein.

Figure 1:
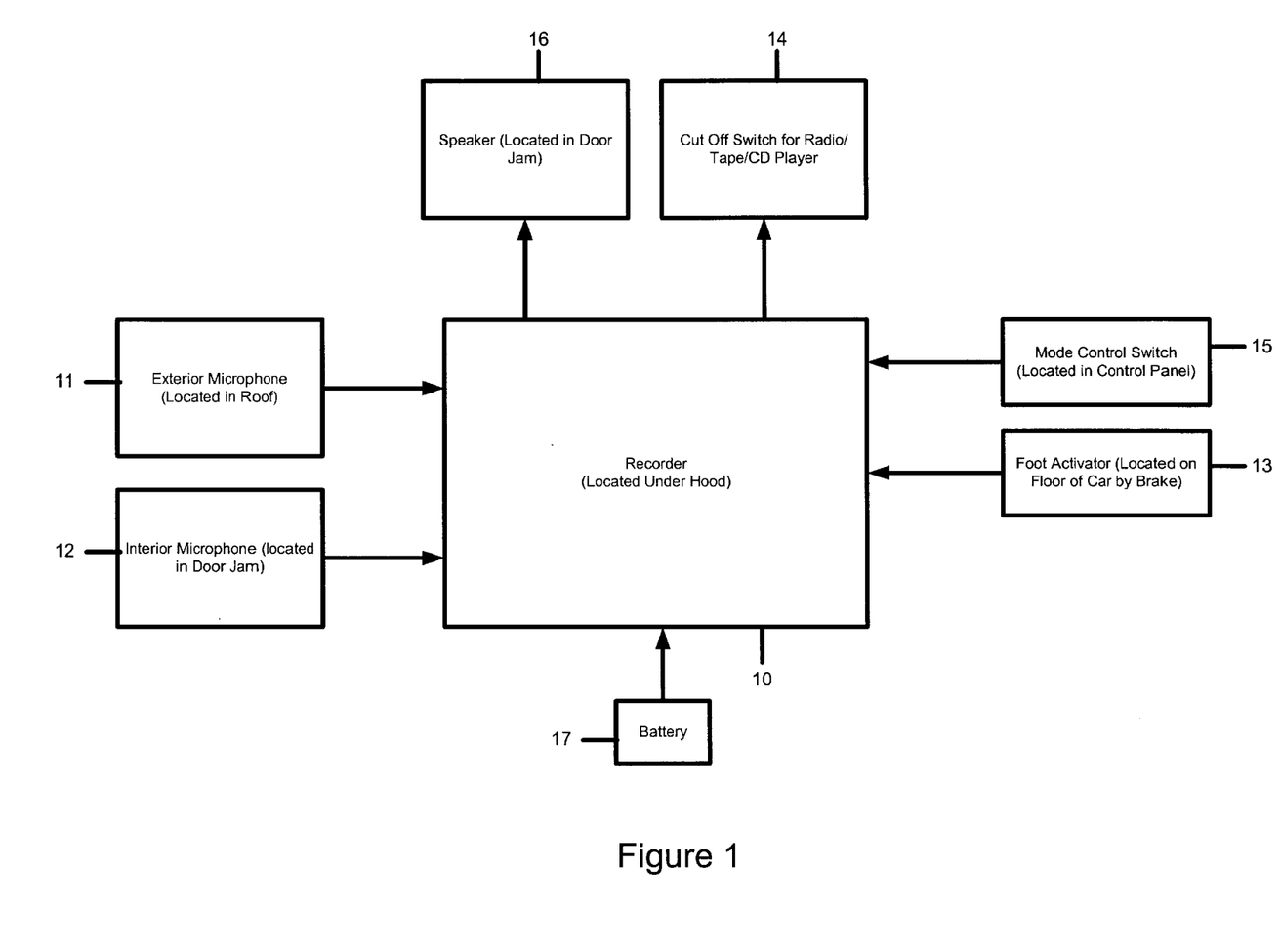
FIG. 1 is a block diagram with a schematic showing an overview of the general components of a foot activated embodiment of a system according to the present invention.

FIG. 1 shows a block diagram of the preferred embodiment of the invention, including a foot activated recorder. In this embodiment, a Mini Tape Recorder 10 is installed on the firewall panel under the hood of the vehicle as a self contained and weather protected component that is connected to the Mode Control Switch 15. The Mode Control Switch 15 has four separate control mode positions: (1) Off position, (2) Silent position, (3) Signal position, and (4) Compliance position. The Mode Control Switch 15 is also electrically interconnected to a Foot Activator 13 located on the floor of the vehicle near the brake pedal.

Figure 2:
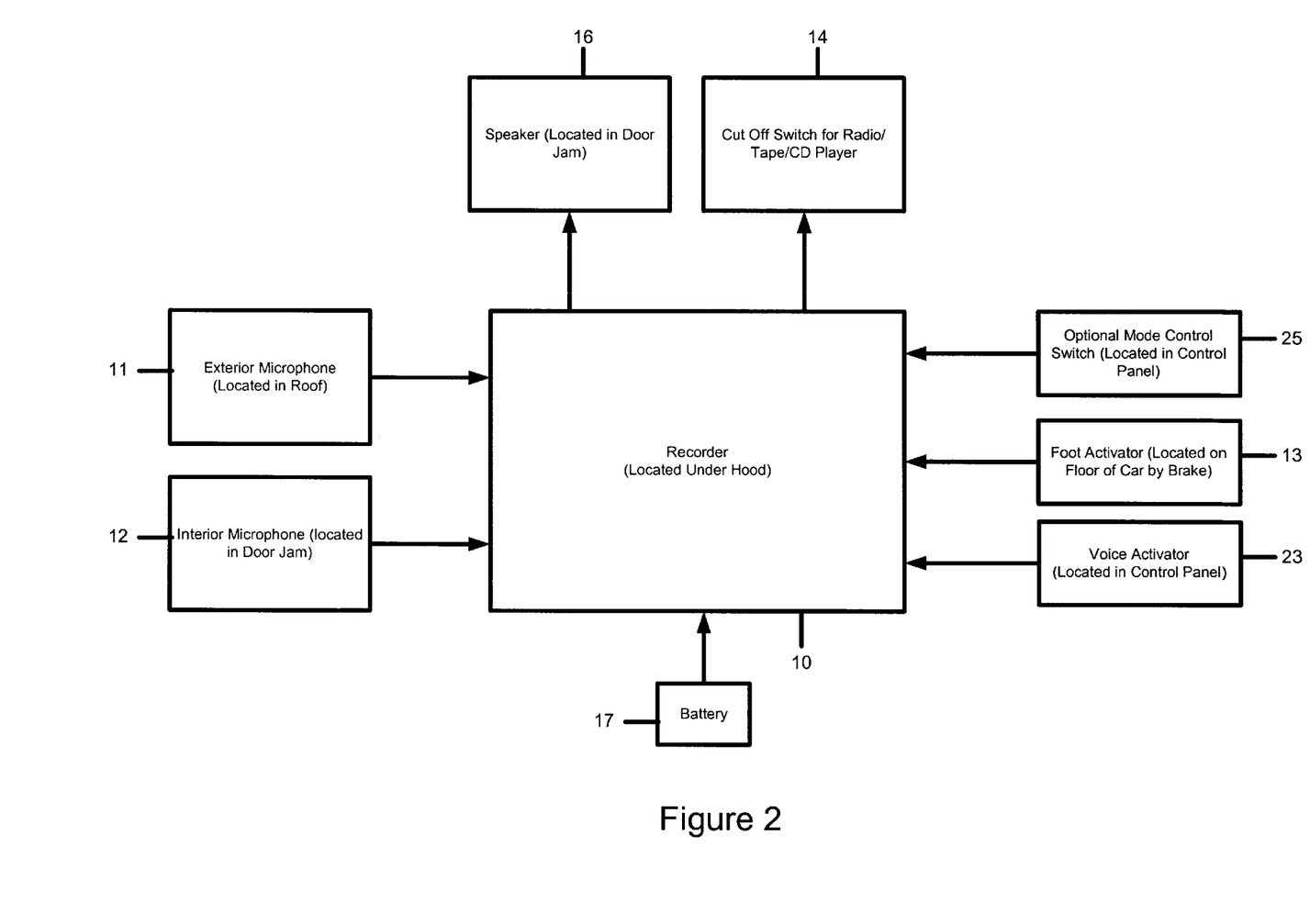
FIG. 2 is a block diagram with a schematic showing an overview of the general components of the optional embodiment of a voice activated and foot activated system according to the invention.

Whenever the Mode Control Switch 15 is in the "Off Position", the Foot Activated Control (FAC) or Voice Activated Control (VAC) remains turned off and can not be activated until Mode Control Switch 15 (FIG. 1) or optional Mode Control Switch 25 (FIG. 2) for the optional voice activated feature has been turned to one of the three other positions. If Mode Control Switch 15 or optional Mode Control Switch 25 (FIG. 2) for the optional voice activated feature has been turned to one of the three other positions and either the Foot Activator Button 13 is engaged for two seconds or more, or alternatively Voice Activated Control 23 (As shown in FIG. 2) is activated by voice command of the driver or passenger, the Motor Vehicle recorder system is "live" and functions as described herein. Alternatively, a wireless remote control can be used to activate the system. Such a remote can be conveniently located, for example, on a keychain.

The alternative configuration of the Foot Activated Control (FAC) is the optional Voice Activated (VAC) Control feature depicted in FIG. 2 where Mode Control Switch 15 has been replaced with (VAC) Mode Control Switch 25 and the Voice Activation Module 23 is added to the basic system. Thus, Voice Activation Module 23 permits the Motor Vehicle Recorder System to be turned on by either engaging Foot Activator Button 13 for two or more seconds or by voice command of the driver or passengers through the use of the Voice Activation Module 23.

Activation of the Motor Vehicle Recorder System, when Mode Control Switch 15 or optional Mode Control Switch 25 is turned the Silent position, results in the Cutoff switch 14 automatically turning off the motor vehicle's electrical power source for the radio, and/or tape recorder and/or CD player to allow the Motor Vehicle Recorder system to function without background noise. Recorder device 10 functions first as a mini-tape recorder and records the sounds picked up from interior mounted microphone 12 and the exterior mounted microphone 11.

Recorder 10 also functions to monitor the motor vehicle speed at all times and is programmed to automatically record the speed of the vehicle on the tape in Recorder 10 for a predetermined time prior to activation of microphones 12 and 11 and the recording function.

Activation of the Motor Vehicle Recorder System, when turned to the Signal Position of Mode Control Switch 15 or optional Mode Control Switch 25, results in an emission function by Recorder 10, through speaker 16 with a short intermittent warning beeping signal for a limited period of time prior to activation of interior mounted microphone 12 or exterior mounted microphone 11 and the recording function of Recorder 10. The Recorder device 10 again functions as a mini-tape recorder and records the sounds picked up from interior mounted microphone 12 or exterior mounted microphone 11. Recorder 10 functions as a monitor of the motor vehicle's speed and is programmed to automatically record the speed of the vehicle on the tape in Recorder 10 for a predetermined time prior to activation of microphones 12 and 11 and the recording function.

Activation of the Motor Vehicle Recorder System, when turned to the Compliance position of Mode Control Switch 15 or optional Mode Control Switch 25, results in Recorder 10 playing a warning notification through speaker 16 that the incident is about to be recorded. The Recorder device 10 again then functions as a recorder and records all the sounds picked up from interior mounted microphone 12 or exterior mounted microphone 11. Recorder 10 functions as outlined above as a monitor of the motor vehicle's speed and is programmed to automatically record the speed of the vehicle on the tape in Recorder for a predetermined time prior to activation of microphones 12 and 11 and the recording function.

Figure 3:
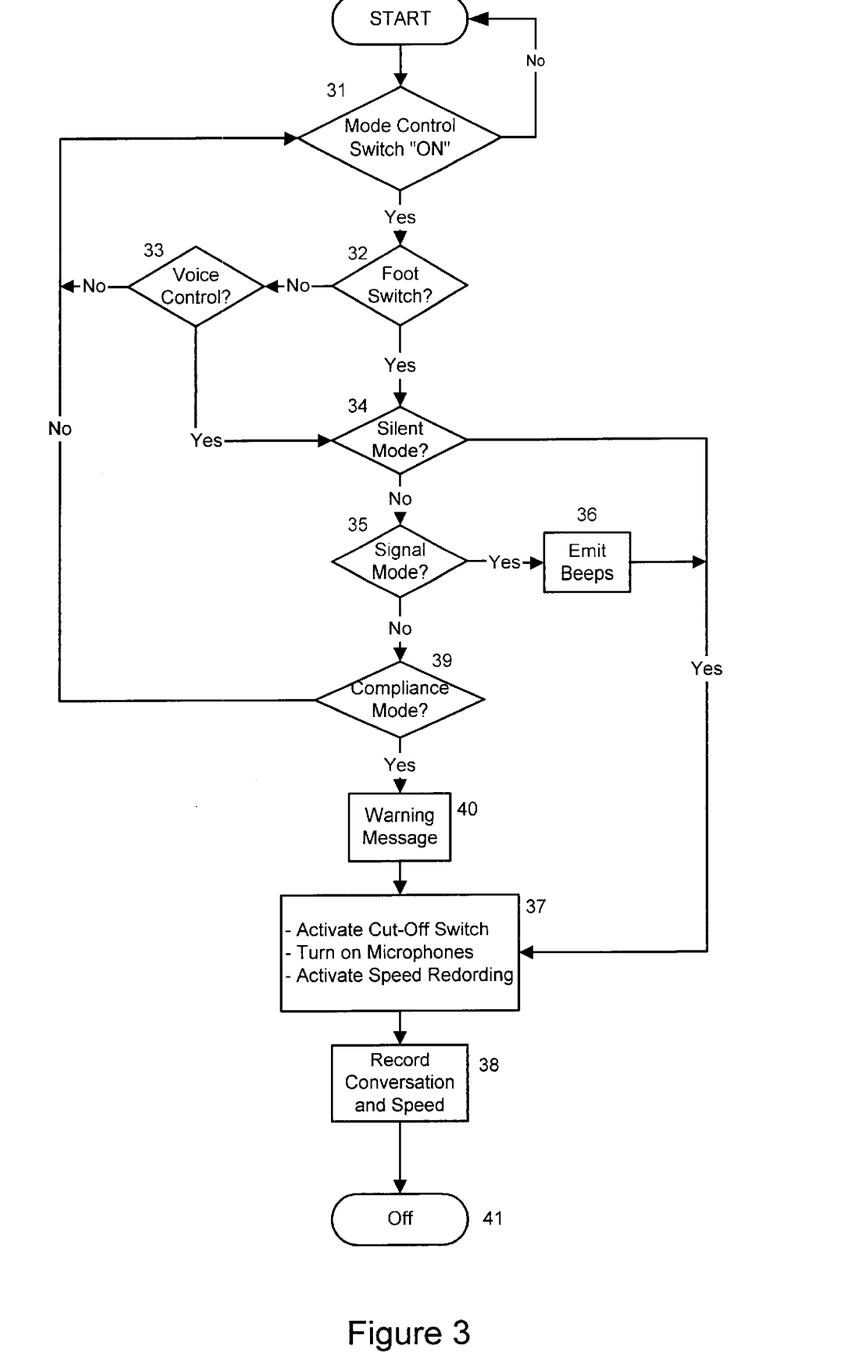
FIG. 3 is a flow chart with a schematic depicting internal system logic of an embodiment of the present invention.

FIG. 3 is explained in more fully in detail as follows. The motor vehicle itself must first be turned on through its own key ignition system. As observed in FIG. 3, the Motor Vehicle Recorder System (MVRS) remains idle until the Mode Control Switch 15, 25 is set to one of the three active positions from the "Off" position at step 31. The MVRS is then activated by the driver depressing the foot activation button/switch preferably located next to the brake pedal as shown at step 32. If the MVRS is equipped with the optional voice activation feature, the driver could alternatively select to activate the MVRS by voice command 33.

As seen in FIG. 3, if the Mode Switch is set on the "Silent" position 34, the MVRS then turns off the power supply to the vehicle's radio and/or tape player and/or CD player; turns on the two MVRS microphones; and the vehicle's speed at a predetermined time (usually 30 seconds) prior to activation of microphones is automatically recorded on the recorder as shown at step 37. The MVRS then records the conversation and any other sounds picked up by the two MVRS microphones, as shown at step 38, until the system is turned to the "Off" position as shown at step 41 by turning the Mode Switch to "Off" or through the vehicle's own key ignition system.

In FIG. 3, if the Mode Switch is set on the "Signal" position at step 35, the MVRS emits short intermittent beeps at step 36, that are audible to the driver and anyone else in the vicinity of the MVRS. The MVRS then turns off the power supply to the vehicle's radio and/or tape player and/or CD player, turns on the two MVRS microphones, and automatically begins recording the vehicle's speed on the Recorder 10 at a predetermined time prior to activation of microphones as shown at step 37. The MVRS then records the conversation and any other sounds picked up by the two MVRS microphones as shown at step 38 until the system is turned "Off" at step 41 by turning the Mode Control Switch to "Off" or through the vehicle's key ignition system.

In FIG. 3, if the Mode Switch is set on the "Compliance" position as shown at step 39, the MVRS broadcasts a prerecorded warning message advising all that the conversation will be recorded 40; then turns off the power supply to the vehicle's radio and/or tape player and/or CD player; turns on the two MVRS microphones; and the vehicle's speed at a predetermined time prior to activation of microphones is automatically recorded on the recorder 37. The MVRS then records the conversation and any other sounds picked up by the two MVRS microphones at step 38 until the system is turned "Off" at step 41 by turning the Mode Control Switch to "Off" or through the vehicle's own key ignition system.

Figure 4:
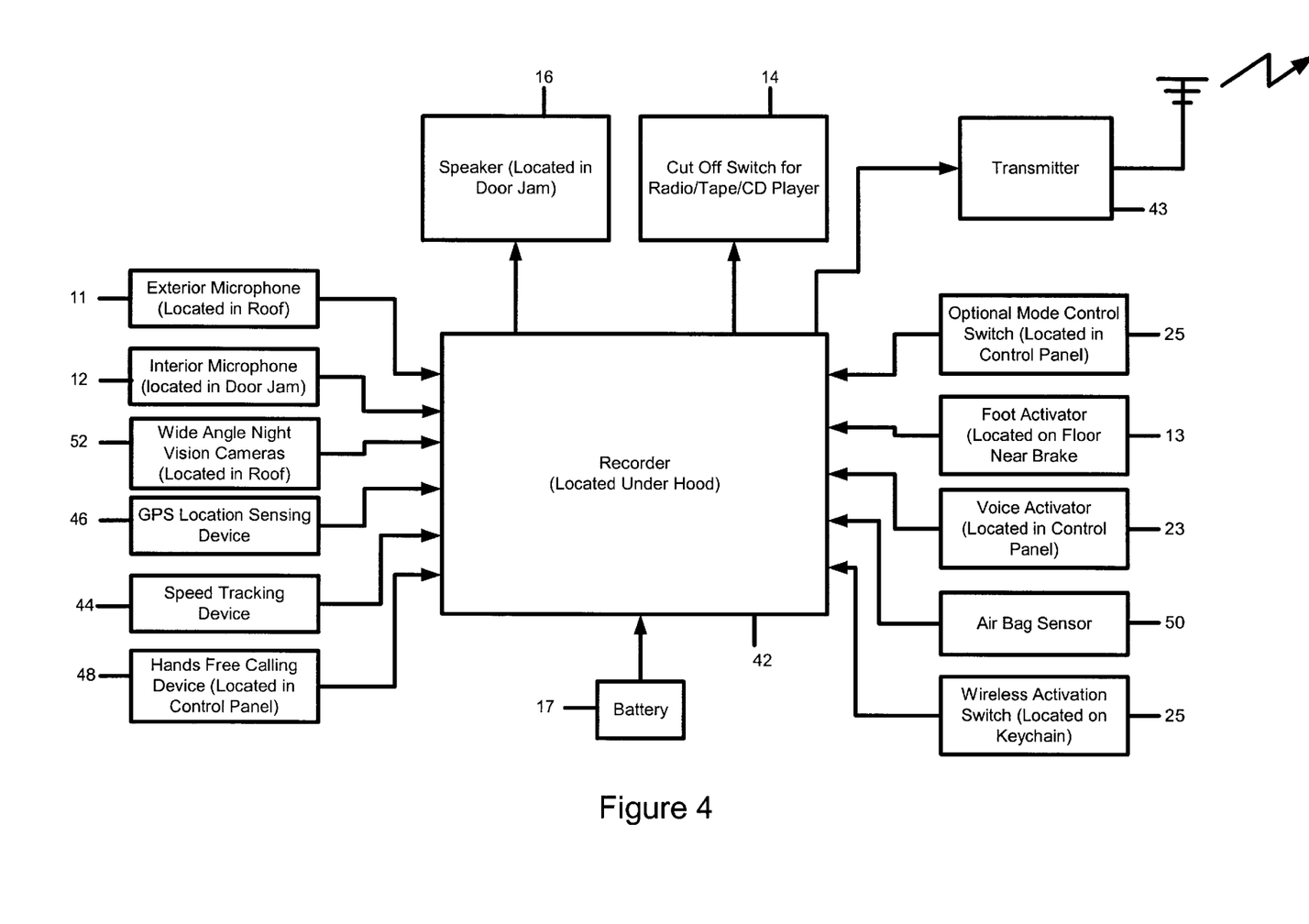
FIG. 4 is a block diagram with a schematic showing an overview of the general components of a preferred embodiment of a system according to the present invention.

With reference to FIG. 4, a preferred embodiment of the invention is shown. The preferred embodiment of the invention includes several additional features, including components for capturing video information in addition to audio, as well as a transmitter for transmitting audio and video data as well as other data to a remote location. In the preferred embodiment it is not necessary to have a tape recorder device located within the vehicle. Rather, this system is provided with a wireless transmitter 43, which is preferably located under the hood of the vehicle. Audio data captured by the microphones, video information captured by one or more pinhole cameras, as well as information regarding the vehicle's speed and location are transmitted through the transmitter 43 to a remote receiving device (not shown). As in the previous embodiment, a mode control switch 25 is provided and has four separate control mode positions: (1) "Off" position, (2) "Silent" position, (3) "Signal" position, and (4) "Compliance" position. The system has a recorder device 42 which is also preferably located under the hood of the vehicle. The recorder 42 receives information from various input devices, and transmits the information via a transmitter 43 to a remote receiver (not shown). The preferred embodiment includes a foot activator 13 and a voice activator 23. A speed tracking device 44 and a GPS device 46 are provided so that the system can record the vehicle speed and location respectively.

The preferred embodiment further includes an optional hands-free calling device 48, which is preferably located in the control panel. The optional hands-free calling device 48 is used to record audio and transmit audio signals over a wireless cellular or PCS network. An airbag sensor 50 is provided so that the system is automatically activated whenever an airbag is deployed. Upon deployment of an airbag, the hands-free calling device 48 is activated and used to automatically call for emergency help. Finally, a wireless activation switch 25 is provided. The wireless activation switch 25 enables a user to activate the system remotely, and can be conveniently located, for example, on a keychain.

As in the previous embodiment, a speaker 16 is provided, which is preferably located inside the drive's side door jam. The speaker 16 is utilized to provide audible signals from the system, including warning beeps, and announcement messages. An interior microphone 12 is provided for capturing audio information, including conversations and any other sounds in the vicinity of the vehicle. The interior microphones are preferably located inside the driver's side door jam. A cut-off switch 14 is provided to turn off the radio, tape, and/or CD player upon activation of the system, so that background noises are minimized.

The preferred embodiment is further provided with one or more cameras 52 located inside the vehicle for capturing video information. The system preferably includes more than one camera which are oriented to capture different fields of view. Optimally, three cameras each capturing 120° or alternatively four cameras each capturing 90° fields of vision are used together to capture a full 360° field of view.

Ideally, the cameras are small pinhole cameras which may be disguised as, for instance, a disco ball or a soccer ball, or any other novelty item and located in the vehicle so as to conceal their presence. The cameras also may be hidden behind the rear window. The cameras preferably are adapted to work in a variety of light conditions.

Figure 5:
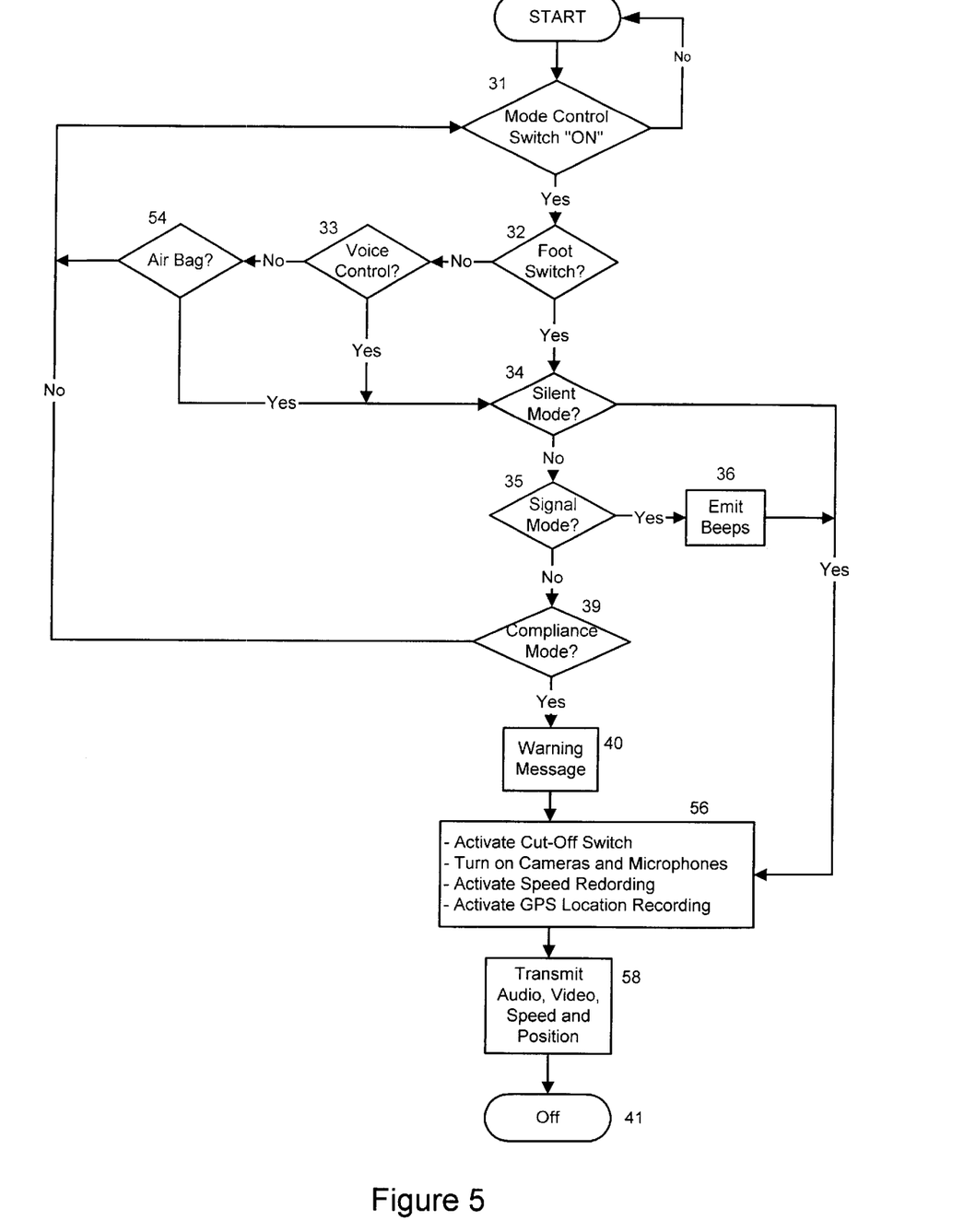
FIG. 5 is a flow chart with a schematic depicting internal system logic of the preferred embodiment of a system according to the present invention.

Turning to FIG. 5, a flowchart is provided to show the operation of the preferred embodiment of the invention. At step 31, the system determines whether the mode control switch is set to one of the three active positions. If the mode control switch 25 is set to the "Off" position, then the system continuously checks to see whether the mode control switch has been moved to one of the three active positions. At step 32, the system checks to see whether the foot control switch 13 has been activated. If the foot control switch 13 has not been activated, the system determines whether the voice control switch 23 has been activated at step 33. If the voice control switch has not been activated, the system checks the air bag sensor 50 to determine whether the airbag has deployed at step 54. If either the foot activation switch 13, the voice activation switch 23, or the airbag sensor 50 has been activated, then the system determines whether the control switch has been set at the "Silent" position at step 34. If the system is in "Silent" mode, then the system performs a series of operations indicated at 56. If "Silent" mode has not been activated at step 34, then the system checks if the mode control switch is set to the "Signal" position at step 35. If the mode control switch is in the "Signal" position, then the system emits a series of short intermittent beeps at step 36 before performing the series of operations indicating at block 56. If at step 35 the mode control switch is not in the "Signal" position, the system determines whether the mode control switch is set to the "Compliance" position at step 39. If the mode control switch is set at the "Compliance" position, then the system broadcasts the recorded warning message through the speaker at step 40, then performs the series of operations shown at block 56.

Once in one of the three active modes ("Silent", "Signal" or "Compliance"), the system performs the series of operations as shown in block 56. First, cut-off switch 14 is activated to turn off the radio, tape and/or CD player. This reduces background noise so that the microphones can capture any conversation or other sound occurring in or around the vehicle. Next, the system turns on the cameras and microphones so that audio and video information may be recorded. Next, the system activates the speed tracking device 44 and begins intermittently transmitting data representing the vehicle's instantaneous speed. The GPS device 46 is also activated, and the vehicle's location is intermittently transmitted. Finally, the system transmitter 43 is activated and begins communicating with a remote receiver located at a remote monitoring station (not shown). At step 58, the system continues to record and transmit audio information received from the microphones 11, 12, video information received from the cameras 52, vehicle speed information received from the speed tracking device 44, and vehicle position data received from the GPS device 46. All of the data is transmitted to a remote receiver. The recording and transmitting operation continues until the mode control switch is turned to the "Off" position or the vehicle ignition is turned off.

Although only a few exemplary embodiments of the present invention have been described in detail above, those skilled in the art will readily appreciate that many modifications and substitutions are possible in the exemplary embodiments without materially departing from the novel teachings and advantages of the invention. Accordingly, all such modifications and substitutions are intended to be included within the scope of the invention as defined in the following claims.

What is claimed is:

1. A motor vehicle recorder system which monitors the speed and location of the vehicle and also records audible and visual information of the motor vehicle comprising:

a recorder device adapted to transmit the speed and location of the vehicle as well as transmitting audio signals and video signals to a receiving device, a speed tracking connected to said recorder device, a GPS device adapted to provide the location of the vehicle connected to said recorder device, two or more microphones connected to said recorder device, at least one camera connected to said recorder device, one or more speakers connected to said recorder device, a multiple position mode function control switch connected to said recorder device, a foot activation control switch connected to said recorder device, a cut-off switch connected to said recorder device for simultaneously turning off the motor vehicle radio and tape player and CD player prior to activation of said microphones and camera.

2. A motor vehicle recorder system as in claim 1, in which an optional voice activation device is added to the system and is connected to said recorder device which permits voice activation of said system.

3. A motor vehicle recorder system as in claim 2, in which said multiple position mode function control switch includes:

the "Off", "Silent", "Signal", and "Compliance" function positions.

4. A motor vehicle recorder system as in claim 3, in which the said multiple position mode function control switch includes:

the "Silent" function position which controls recording the vehicle speed and location at programmable intervals and at a programmable time prior to activation of the system, wherein activation of the system comprises activation of said recorder, microphones, camera, speaker, and the said cut-off switch.

5. A motor vehicle recorder system as in claim 3, in which the said multiple position mode function control switch includes:

a "Signal" function position which controls recording the vehicle speed and location at programmable intervals and at a programmable time prior the activation of the system, wherein activation of the system comprises activation of said recorder, microphones, camera, speaker, and said cut-off switch, and emission of an intermittent beep sound through said speaker.

6. A motor vehicle recorder system as in claim 3, in which the said multiple position mode function control switch includes:

a "Compliance" function position which controls recording the vehicle speed and location at programmable intervals and at a programmable time prior to activation of the system, wherein activation of the system comprises activation of said recorder, microphones, camera, speaker, and said cut-off switch, and a broadcast through said speaker from the recorder device of a prerecorded warning message that a recording will be made of the incident.

7. A motor vehicle recorder system as in claim 3, in which said recorder device includes the capability to record the vehicle speed at intermittent time intervals and to record at a programmable time prior to activation of the system, in which said intervals can be programmed by adjusting a designated variable setting of said recorder device.

8. A motor vehicle recorder system as in claim 1, wherein said camera is concealed as a decorative ornament.

9. A motor vehicle recorder system as in claim 1, further comprising a wireless activation switch connected to said recorder device, adapted to enable a user to activate said system remotely.

10. A motor vehicle recorder system which monitors and records the speed and location of a vehicle at programmable intervals and at a programmable time prior to activation of the system, and also records audible and visual information in and around said motor vehicle comprising:
  a recorder device capable of monitoring and recording the speed and location of the vehicle as well as recording audio and video information,
  a speed tracking device connected to said recorder device,
  a GPS device adapted to provide location information connected to said recorder device,
  two or more microphones connected to said recorder device,
  at least one camera connected to said recorder device,
  one or more speaker connected to said recorder device,
  a multiple position mode function control switch connected to said recorder device,
  a foot activation control switch connected to said recorder device,
  a cut-off switch connected to said recorder device adapted to turn off the motor vehicle radio and tape layer and CD player prior to activation of said microphones and camera,
  a transmitter connected to said recorder device adapted to transmit data relating to said speed, location, audio and video information to a remote receiving device.

11. A motor vehicle recorder system as in claim 10, in which an optional voice activation device is added to the system and is connected to said recorder device which permits a voice activation of the said system.

12. A motor vehicle recorder system as in claim 11, in which said multiple position motor function controls witch includes:
  the "Off", "Silent", "Signal", and "Compliance" function positions.

13. A motor vehicle recorder system as in claim 12, in which the said multiple position mode function control switch includes:
  a "Silent" function position which controls the vehicle speed and location at programmable intervals at a programmable time prior to activation of the system,
  wherein activation of the system includes activation of said recorder, microphones, camera, speaker, and said cut-off switch.

14. A motor vehicle recorder system as in claim 12, in which the said multiple position mode function control switch includes;
  a "Signal" function position which controls recording the vehicle speed ad location at a programmable time prior to activation of the system;
  wherein activation of the system comprises activation of said recorder, microphones, camera, speaker, and said cut-off switch, and emission of an intermittent beep sound by said speaker.

15. A motor vehicle recorder system as in claim 12, in which the said multiple position mode function control switch includes;
  a "Compliance" function position which controls recording the vehicle speed at programmable intervals at a programmable time prior to activation of the system,
  wherein activation of the system comprises activation of the said recorder, microphones, camera, speaker, and cut-off switch, and broadcasting a prerecorded warning message through said speaker that a recording will be made at the incident.

16. A motor vehicle recorder system as in claim 12, in which the recorder device includes the capability to silently and continuously monitor as well as to record the vehicle speed and location at intermittent time intervals and to record at a programmable time prior to activation of the system in which said intervals can be programmed by adjusting a designated variable settings of said recorder device.

17. A method of monitoring a motor vehicle comprising:
  recording in a motor vehicle the speed and location of the vehicle at programmable intervals and at a programmable time prior to activating said recording system,
  activating said recording system,
  engaging a cut-off switch adapted to turn off a radio, tape player or CD player located in said vehicle,
  generating sound information using at least one microphone located on said vehicle,
  generating visual information from at least one camera located on said vehicle,
  emitting a sound from at least one speaker located on said vehicle, said sound selected from the group comprising an intermittent beeping sound and a warning message indicating that a recording will be made of the incident,
  transmitting said vehicle speed and location, and said sound information and said visual information to a remote receiving device.

18. The method of claim 17, wherein activating said recording system comprises selecting one of a plurality of active modes on a multiple position mode function control switch connected to said recorder device.

19. The method of claim 18, wherein activating said recording system is accomplished by any one of a foot control switch, a voice activation switch, or an airbag deployment switch.

20. The method of claim 18, wherein said multiple position mode function control switch includes an "Off" position, and said plurality of active modes correspond to "Silent", "Signal", and "Compliance" function positions respectively.

21. The method of 20, further comprising:
  moving said multiple position mode function control switch to said "Silent" function position,
  recording the vehicle speed and location at programmable intervals and at a programmable time prior to activating said system,
  activating said recorder, microphones, camera, speaker, and cut-off switch.

22. The method of claim 20, further comprising:
  moving said multiple position mode function control switch to said "Signal" function position, emitting an intermittent beep sound by said speaker, recording the vehicle speed and location at programmable intervals and at a programmable time prior to activation of the system, activating said recorder, microphones, camera, speaker, and cut-off switch.

23. The method of claim 20, further comprising:

moving said multiple position mode function control switch to said "Compliance" function position, broadcasting through said speaker a pre-recorded message that a recording will be made of the incident, recording the vehicle speed and location at programmable intervals and at a programmable time prior to activation of the system, activating said recorder, microphones, camera, speaker, and cut-off switch.

\* \* \* \* \*